United States Patent [19]

Masuda

[11] Patent Number: 5,048,890
[45] Date of Patent: Sep. 17, 1991

[54] GUIDE RAIL FOR A SLIDING ROOF APPARATUS

[75] Inventor: Mitsuyoshi Masuda, Nagoya, Japan

[73] Assignee: Aisin Seiki Kabushiki Kaisha, Japan

[21] Appl. No.: 528,546

[22] Filed: May 25, 1990

[30] Foreign Application Priority Data

May 26, 1989 [JP] Japan .................................. 1-133090
Jun. 1, 1989 [JP] Japan .................................... 1-64151

[51] Int. Cl.⁵ .............................................. B60J 7/22
[52] U.S. Cl. ...................................... 296/216; 72/256
[58] Field of Search ................. 296/216, 221, 222, 223

[56] References Cited

U.S. PATENT DOCUMENTS 4,159,144  6/1979  Ehlen et al. ........................... 296/216
4,811,985  3/1989  Krüger et al. ..................... 296/216 X
4,844,532  7/1989  Ono et al. ......................... 296/216 X
4,874,202 10/1989  Ochiai et al. .......................... 296/222
4,923,245  5/1990  Kumahara ........................ 296/216 X

FOREIGN PATENT DOCUMENTS 57-24120  2/1982  Japan .................................... 296/216

Primary Examiner—Robert R. Song
Attorney, Agent, or Firm—Finnegan, Henderson, Farabow, Garrett & Dunner

[57] ABSTRACT

An elongated bar to serve as a guide rail of a sliding roof in an automobile is formed by extrusion molding in such a manner that a support projection is provided on a lower side of the bar at a central portion thereof in the longitudinal direction. The bar is cut to a predetermined lenth and bent into a substantially u-shaped configuration, so that the guide rail has two parallel portions. A center frame, which extends between the parallel portions to support the guide rail, is secured at its ends to brackets fixed to a side frame of the automobile.

3 Claims, 6 Drawing Sheets

GUIDE RAIL FOR A SLIDING ROOF APPARATUS

BACKGROUND OF THE INVENTION

This invention relates to a guide rail and a method of forming the guide rail in a sliding roof apparatus, which is arranged around an opening provided on the roof of an automobile, in order to open or close the opening in the roof. In vehicles having a sunroof, a mechanism is typically installed for opening and closing the opening by a manually operated or motor-driven sliding panel. The popularity of sunroofs is generally attributed to the fact that sunroofs are considered to provide the occupants of the vehicle with a feeling of space openness, while furnishing the passenger compartment with excellent ventilation.

The mechanism for opening and closing the roof panel opening by the sliding panel includes a square housing, which has a centrally located opening, secured to the periphery of the opening in the roof panel of the automobile. A guide rail is secured to the left, right, and front (or rear) sides of the housing, end is driven by an electric motor attached to the front or rear portion of the housing. A pair of shoes are accommodated in the guide rail. The shoes are connected to the sliding panel via links having cam grooves, and are further connected to the electric motor via drive cables.

The sliding panel is so adapted that when an occupant of the automobile switches on the electric motor to open the panel, the motor is driven into operation and pulls the shoes backwardly to raise the sliding panel about its leading edge, thereby causing the sliding panel to be tilted upwardly. This position can be maintained for some time with the motor being left switched on. An occupant who desires the up-tilted state switches off the motor at this time.

If the occupant wishes to retract the sliding panel to uncover the opening in the roof panel, the electric motor is switched on, whereupon the electric motor is again driven into operation to retract the upwardly tilted sliding panel and uncover the opening in the roof panel, thereby exposing the interior of the passenger compartment to the outside. To close the opening, the electric motor is switched on in the closing direction, whereby the sliding panel is made to perform an operation which is the reverse of the foregoing.

The guide rail of this sliding roof apparatus comprises two parallel portions situated on the lower side of the sliding panel and on both the sides of the housing. The parallel portions, which extend longitudinally along the vehicle, slidably support the shoes of the sliding panel. The guide rail also includes a connecting portion extending between the front ends of the parallel portions of the rail, thereby forming a generally U-shaped configuration. An aluminum alloy exhibiting little expansion and contraction and a low specific gravity preferably mainly is used as the material for the guide rail.

As for the method of bending the guide rail, both ends of an extrusion-molded elongated bar are chucked by respective cylinders adopting, as a neutral axis, the inner peripheral side of the bar that is to be bent. The portion of the bar to be bent on neutral axis is supported on a jig. Then, the cylinders are moved along respective arcs with the point of contact between the jig and the inner peripheral side of the bar or the guide rail serving as a fulcrum, thereby bending the bar or the rail. This completes the bending work.

The guide rail bent by this conventional bending method will not expand or contract at the inner peripheral side, which is the neutral axis. However, since elongation in the longitudinal direction is required on the outer peripheral side and the width of the guide rail is relatively large, the bent portion of the guide rail cannot be made with a small radius. Such elongation is proportional to the distance between the inner peripheral side, which is the neutral axis, and the outer peripheral side. The amount of required elongation increases in proportion to this distance.

Accordingly, when an effort is made to provide a small radius in order to obtain a large effective opening in the sliding roof apparatus, the guide rail breaks on its outer peripheral side. As such, in conventional sliding roofs, bending is, limited to an outer-periphery radius-/inner-periphery radius ratio of 1.5.

With a guide rail having a large radius, the guide rail will bite into both ends at the front of the opening of the sliding roof apparatus, as a result of which a large effective opening cannot be obtained.

The guide rail mentioned above can be provided with a center frame. An example of such an arrangement is disclosed in the specification of Japanese Utility Model Application Laid-Open (KOKAI) No. 57-24120. This prior-art guide rail has a center frame connecting substantially central parts of the above-mentioned parallel portions and extending in the transverse direction of the automobile. The end portions of the center frame are fixedly secured to the lower surfaces of the parallel portions of the guide rail.

It is necessary for the center frame to reinforce the guide rail against externally applied forces. The conventional center frame acts as a guiderail reinforcing member with regard to torsion. However, since the center frame is fixedly secured to the lower surfaces of the parallel portions of the guide rail, it cannot provide reinforcement against external force applied in the vertical direction. In a sliding roof apparatus having a guide rail with such a structure, the panel is subjected to suction due to a pressure difference between the passenger compartment and the roof of the automobile at high-speed travel, and vibration is produced when the vehicle is traveling. As a result, the parallel portions and both end portions of the center frame experience deformation and the sliding roof apparatus will no longer operate smoothly.

SUMMARY OF THE INVENTION

An object of the present invention is to provide a method of bending a guide rail of a sliding roof apparatus for an automotive vehicle in which the foregoing drawbacks of the prior art are avoided.

The method of the present invention comprises the steps of forming an elongated bar by extrusion molding in such a manner that a projection is provided on a lower side of the bar at a central portion thereof in the longitudinal direction, cutting the bar to a predetermined length, providing notches in inner peripheral flanges of the bar, chucking both ends of the bar by respective cylinders whereby a wall on an inner peripheral side of the projection serves as a neutral axis, supporting a portion of the bar at which the bar is to be bent on a jig, and pressing the bar along the jig to form a bend.

The guide rail formed by the method of the invention is such that a bend is formed by using, as the neutral axis, the inner peripheral side wall of the longitudinally extending projection provided on lower side of the central portion of the elongated bar. As a result, the bar will not expand or contract at its central portion along the projection. Since the distance between the neutral axis and the outer peripheral end is shortened, longitudinal elongation which occurs on the outer peripheral side can be suppressed. Though some shrinkage may occur on the inner peripheral side, this shrinkage can be absorbed by the notches provided in advance by press molding. By virtue of this method, it is possible to perform bending with a small radius in which the outer-periphery radius/inner-periphery radius ratio is approximately 2.5. As a result, the sliding roof apparatus can be provided with a large effective opening. Bending work with the conventional bending radius can also be performed.

Another object of the invention is to provide a mounting structure of a guide rail equipped with a center frame in a sliding roof apparatus of an automotive vehicle, which mounting structure solves the aforementioned problems of the prior art.

According to the present invention, both ends of a center frame are secured to the guide rail and to a bracket fixed to a side frame of the vehicle body.

By adopting the center frame having this configuration, the center frame and the guide rail are fixed, and both ends of the center frame serving as one mounting member of the guide rail are secured to the side frame of the vehicle body by the bracket. As a result, the mounting rigidity of the sliding roof apparatus of an automobile can be improved. Because of this improvement in mounting rigidity, greater strength is provided with respect to a load acting upon the fixed part of the automobile roof, and deformation of mounted portions can be prevented.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENT

An embodiment of the present invention will now be described with reference to FIGS. 1 through 5.

Figure 5:
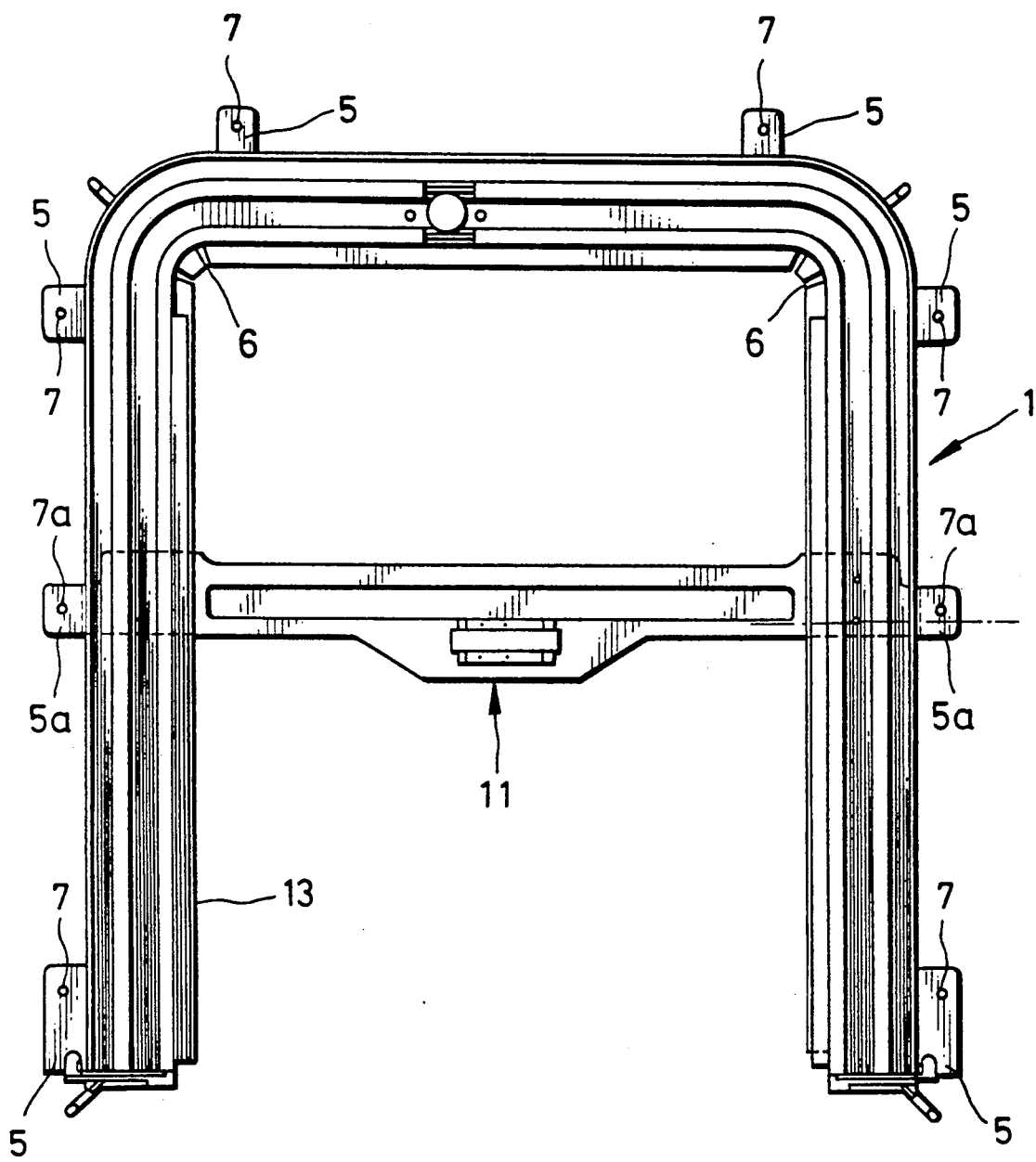
FIG. 5 is a view of the guide rail of the invention as seen from above the roof facing toward the front of the vehicle.

As shown principally in FIG. 5, an elongated bar 1 has a generally U-shaped section comprising the side wall on the inner peripheral side of the bar, the side wall on the outer peripheral side and the bottom portion of the bar. The bar includes longitudinally extending projection 4 (FIGS. 2 and 4), which is provided on the lower side of this U-shaped section at the time of extrusion molding (i.e., before the bar is bent). The projection 4 extends along the entire length of the bar in this embodiment in view of the extrusion work. However, since the projection 4 is necessary only at bent portions, it is possible to cut off the projection 4 after extrusion except at desired portions. The extruded material is cut to the length required for a guide rail.

Figure 1:
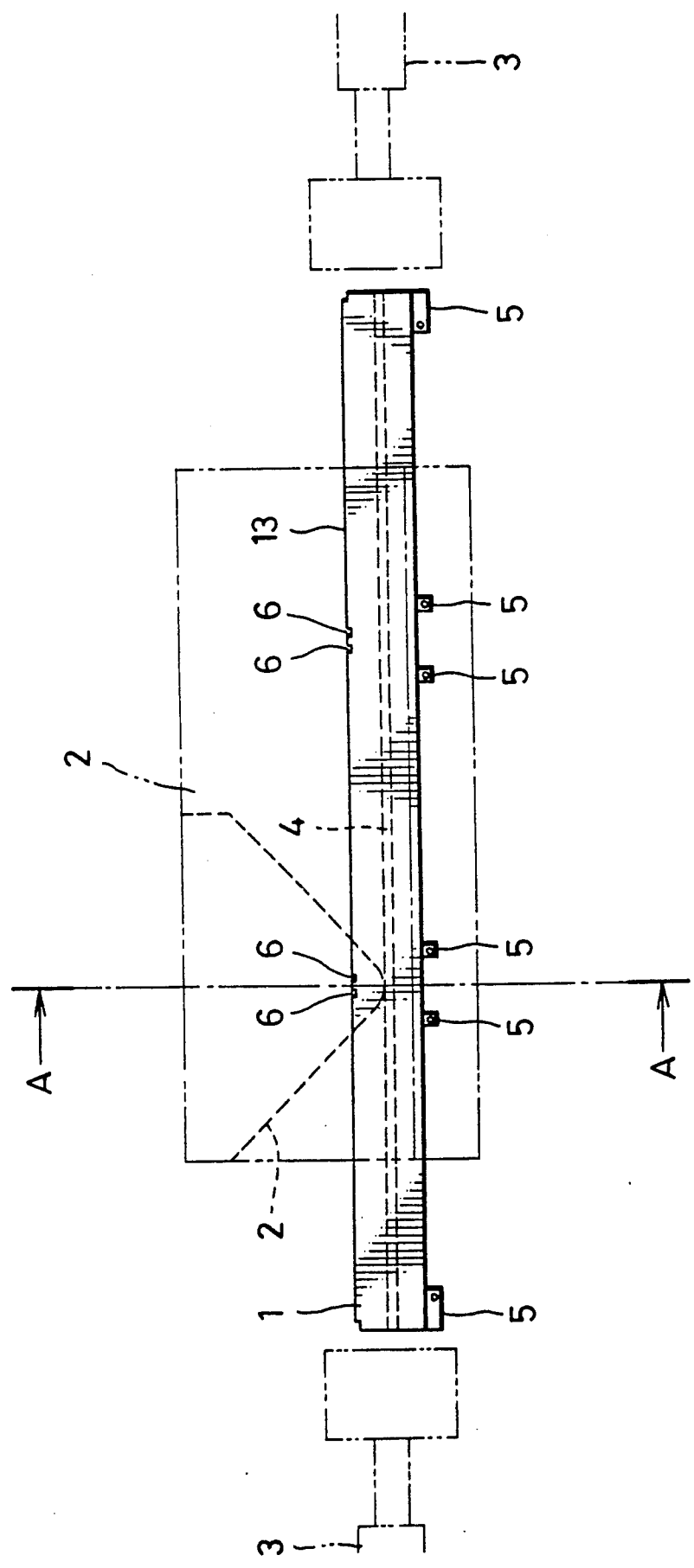
FIG. 1 is a diagram illustrating a step in which an extruded aluminum material of a guide rail according to the present invention is set upon a jig.
Figure 2:
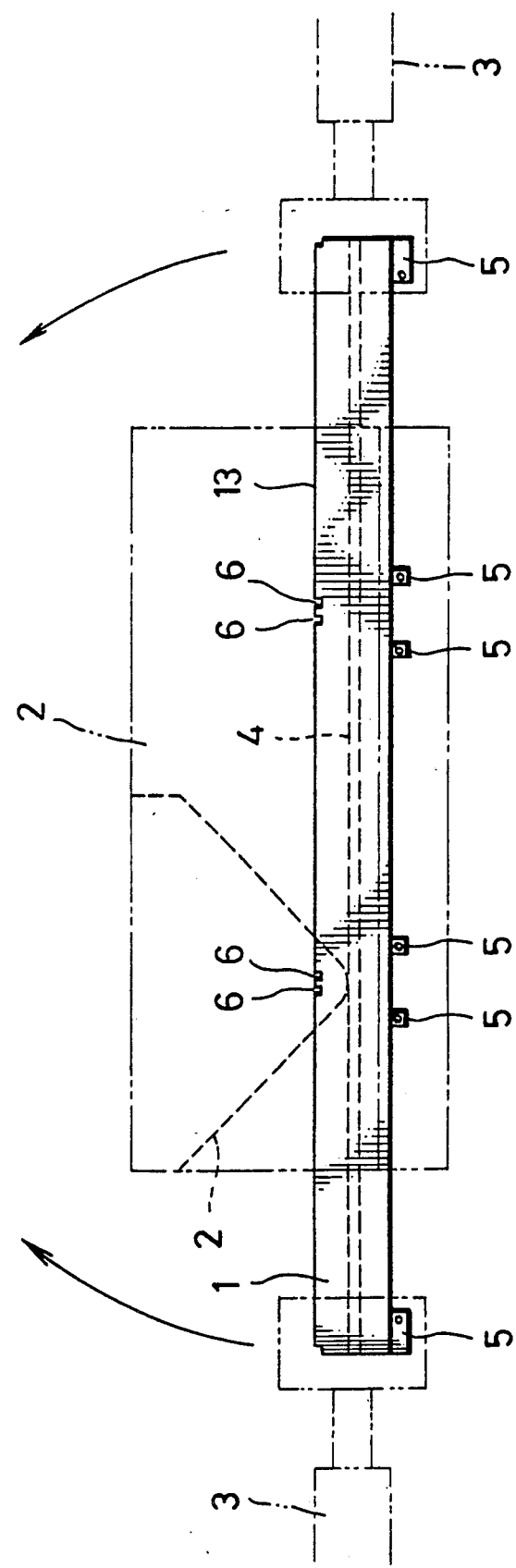
FIG. 2 is a diagram illustrating a step in which both ends of the extruded aluminum material of the guide rail are chucked on respective cylinders.
Figure 3:
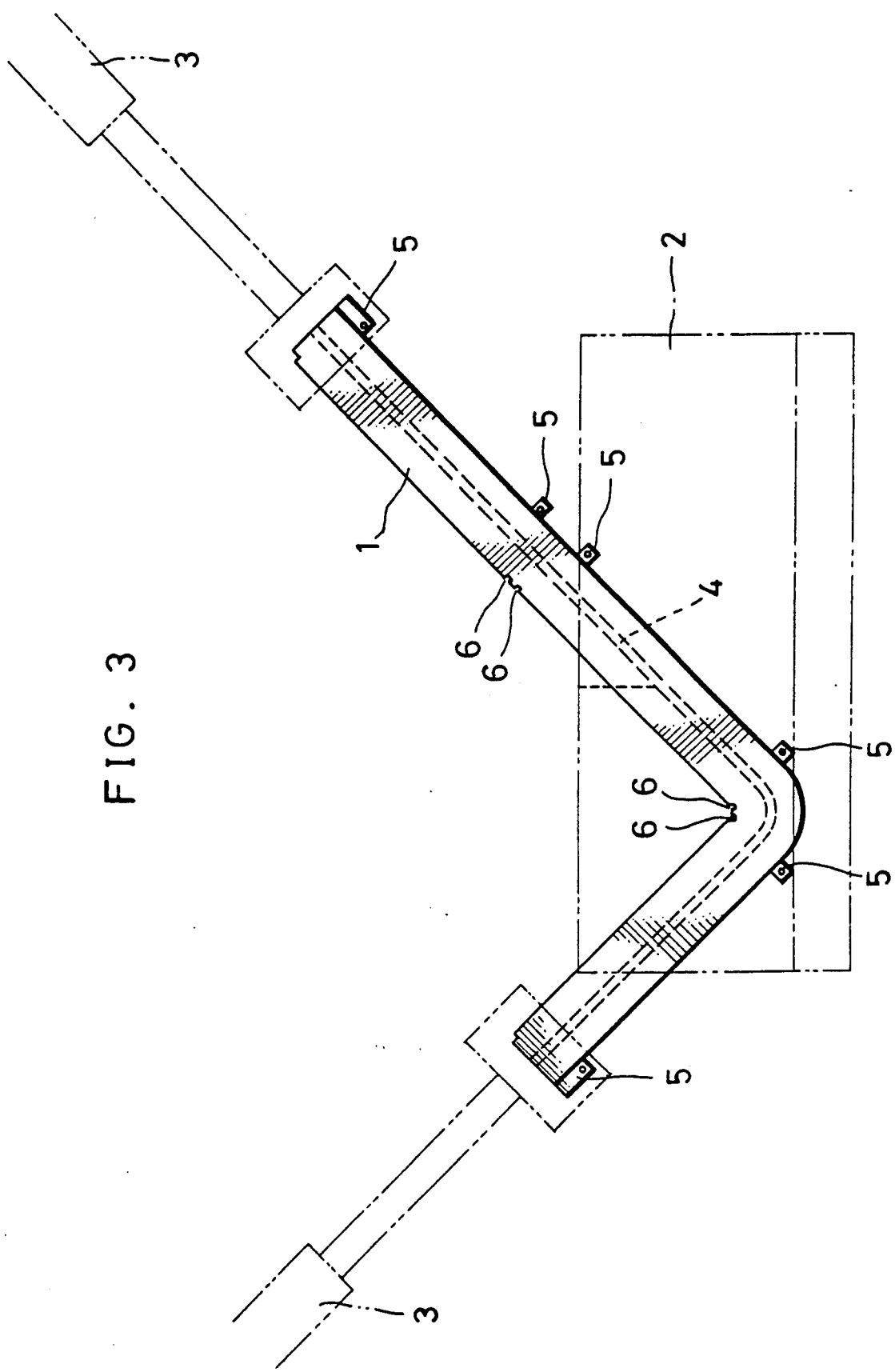
FIG. 3 is a diagram illustrating a step in which bending of the extruded aluminum material of the guide rail is completed.
Figure 4:
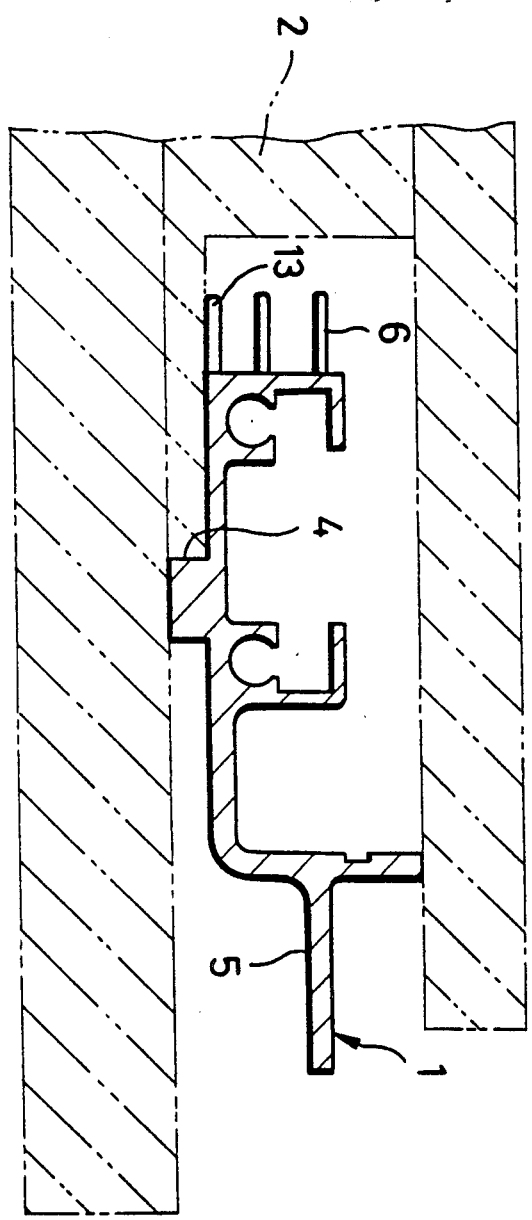
FIG. 4 is a sectional view taken along line A—A of FIG. 1.

As shown in FIG. 1, notches 6 are formed in the bar 1 at portions of flanges 13 on the inner peripheral side of portions of the bar 1 to be bent. The outer peripheral side of the bar 1 includes mounting pieces 5 formed by welding or by cutting. The bar 1 is then set in a jig 2 in such a manner that a portion of the inner peripheral wall of the projection 4 to be bent abuts against a curved wall of the jig 2. As shown in FIG. 2, both ends of the bar 1 are chucked or supported by cylinders 3 and the cylinders 3 are moved along respective arcs with the tip of the curved wall of jig 2 serving as a fulcrum, thereby bending the bar 1 as shown in FIG. 3. This completes the bending work.

The embodiment described above is a bending method using a stretch bender. However, there are various other bending methods that do not rely upon a stretch bending and the present invention can be applied to these methods as well.

According to the present invention, projections 4 are disposed on the underside of the guide rail and therefore cannot be seen when the guide rail is mounted on the vehicle. Accordingly, these projections do not detract from the appearance of the guide rail. In addition, since the aluminum material is thickened only at the central portion of the guide rail on the bottom thereof, greater strength is available for supporting a bolt when the bolt is passed through the rail. Accordingly, the thickened portion can be utilized to fixedly secure the guide rail by passing a bolt therethrough.

In accordance with the present invention, the bending radius of the aluminum guide rail can be relatively small. This makes it possible to enlarge the effective opening of the sliding roof apparatus. In addition, since only the linear parts of the parallel portions of the guide rail move, the support member which supports the panel of the sliding roof apparatus can be disposed forwardly of the panel, thereby raising the strength with which the panel is supported.

As shown in FIG. 5, mounting portions 5, 5a are secured to a space bracket 9 on the side of a vehicle frame 8 by bolts 10 inserted through holes 7, 7a in the mounting portions 5, 5a. Similarly, the bracket a is attached to the vehicle frame 8 by bolts (unnumbered).

Figure 6:
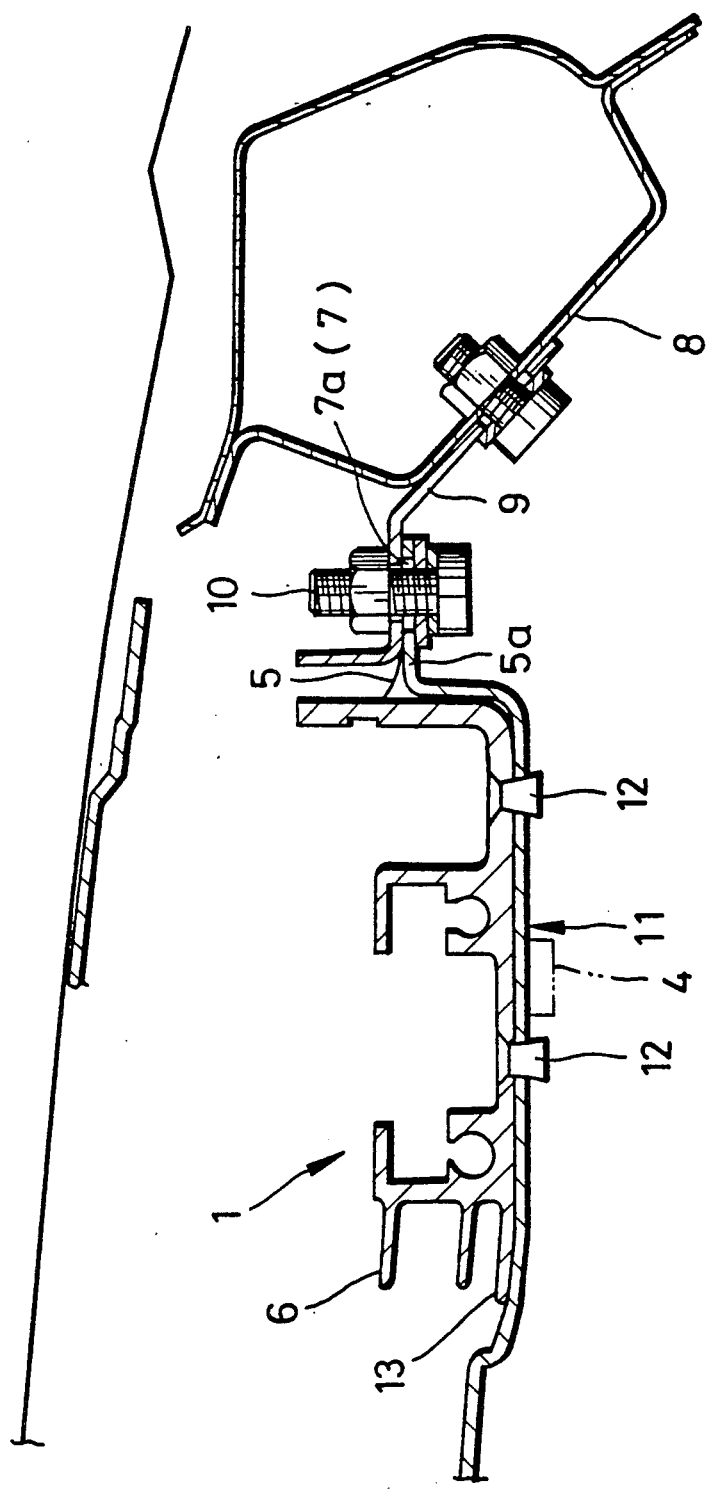
FIG. 6 is a sectional view taken along line A—A of FIG. 5 and showing the guide rail when attached.

As illustrated in FIG. 6, an aluminum center frame 11 supports the guide rail 1 substantially at the central portion thereof in the longitudinal direction. The mounting portions 5a are disposed at both ends of the center frame 11. As depicted in FIG. 5, the center frame 11 is fixedly secured to the bracket 9 by bolts 10 passed through the holes 7a provided in the mounting portions 5a, which have a substantially z-shaped configuration.

The center frame 11 and the guide rail 1 are fixed by rivets 12 substantially at the center of a groove. By securing the center frame 11 and guide rail 1 by the rivets 12, the center frame 11 and guide rail 1 are united into a whole, and these are fixed integrally to the vehicle frame 8. Strength and rigidity are thus assured.

The invention is advantageous in that the strength with which the sliding roof apparatus is mounted is improved, thus eliminating the deformation of the mounting portions of the guide rail that occurs in the prior art.

As many apparently widely different embodiments of the present invention can be made without departing from the spirit and scope thereof, it is to be understood that the invention is not limited to the specific embodiments thereof except as defined in the appended claims.

What is claimed is:

1. A sliding roof apparatus for an automotive vehicle comprising:

a guide rail for supporting a sliding roof member, said guide rail being mounted substantially adjacent an opening in a roof of the automotive vehicle, said guide rail being an integrally molded body having two parallel portions extending longitudinally relative to the vehicle and a connecting portion connecting opposing ends of said parallel portions;

reinforcing means integrally connected to said guide rail for rigidly supporting said guide rail about said opening, said reinforcing means including a center frame connecting substantially central portions of said parallel portions and extending tranversely relative to the vehicle, said center frame having opposite end portions;

mounting means substantially adjacent peripheral edges of said guide rail for securing said center frame and said guide rail to brackets attached to the body of the vehicle, whereby said opposite end portions of said center frame are separately attached to brackets fixed to the body of the vehicle.

2. The sliding roof apparatus according to claim 1 wherein said reinforcing means includes a projection extending along a base of said guide rail.

3. The sliding roof apparatus according to claim 1, wherein said reinforcing means also includes rivets integrally connecting said center frame to said guide rail.

* * * * *